June 15, 1937.  T. G. FERGUSON  2,083,776
LIQUID DISPENSING APPARATUS
Filed May 2, 1934   2 Sheets-Sheet 1
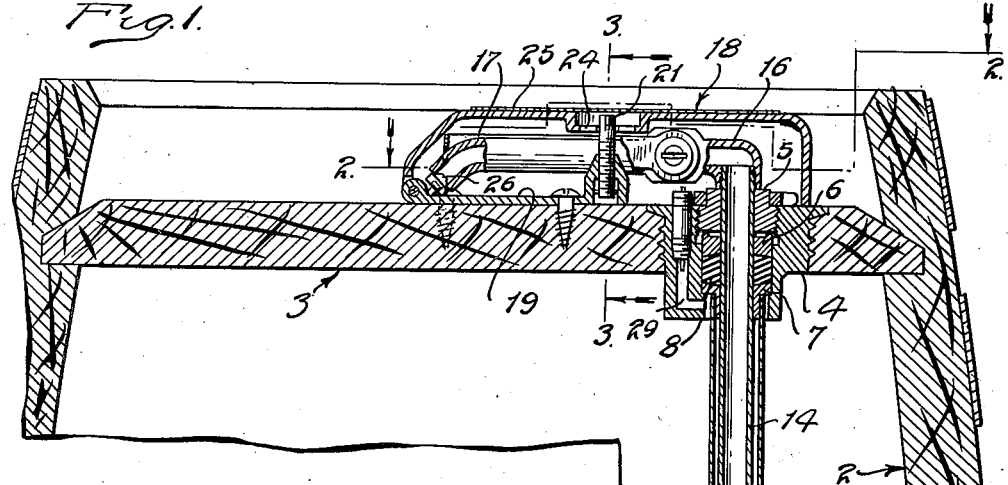
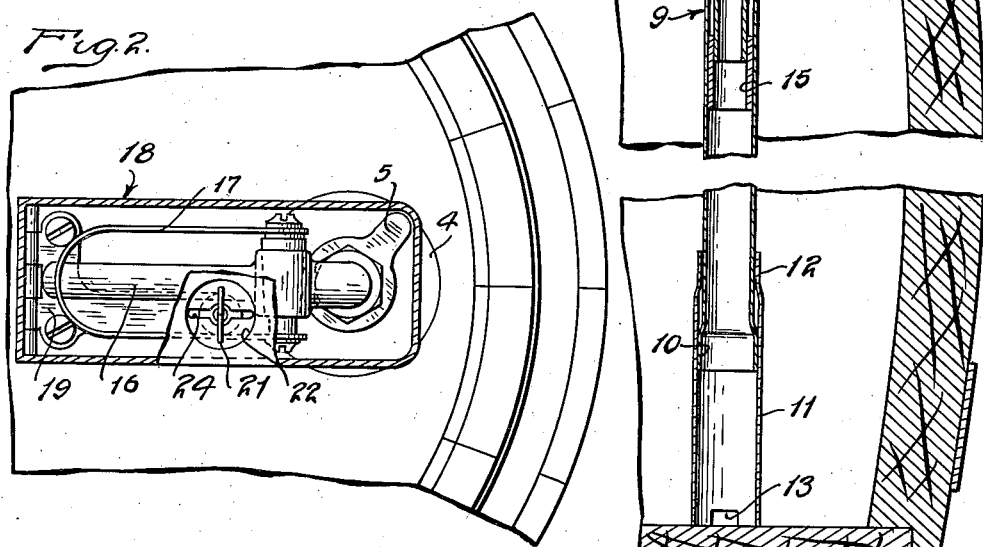
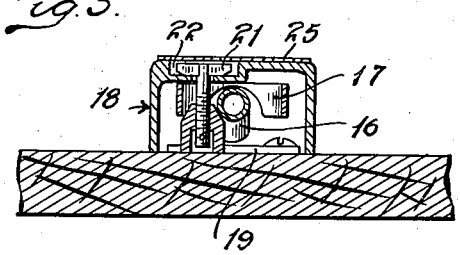
INVENTOR.
THOMAS G. FERGUSON.
BY
ATTORNEYS.

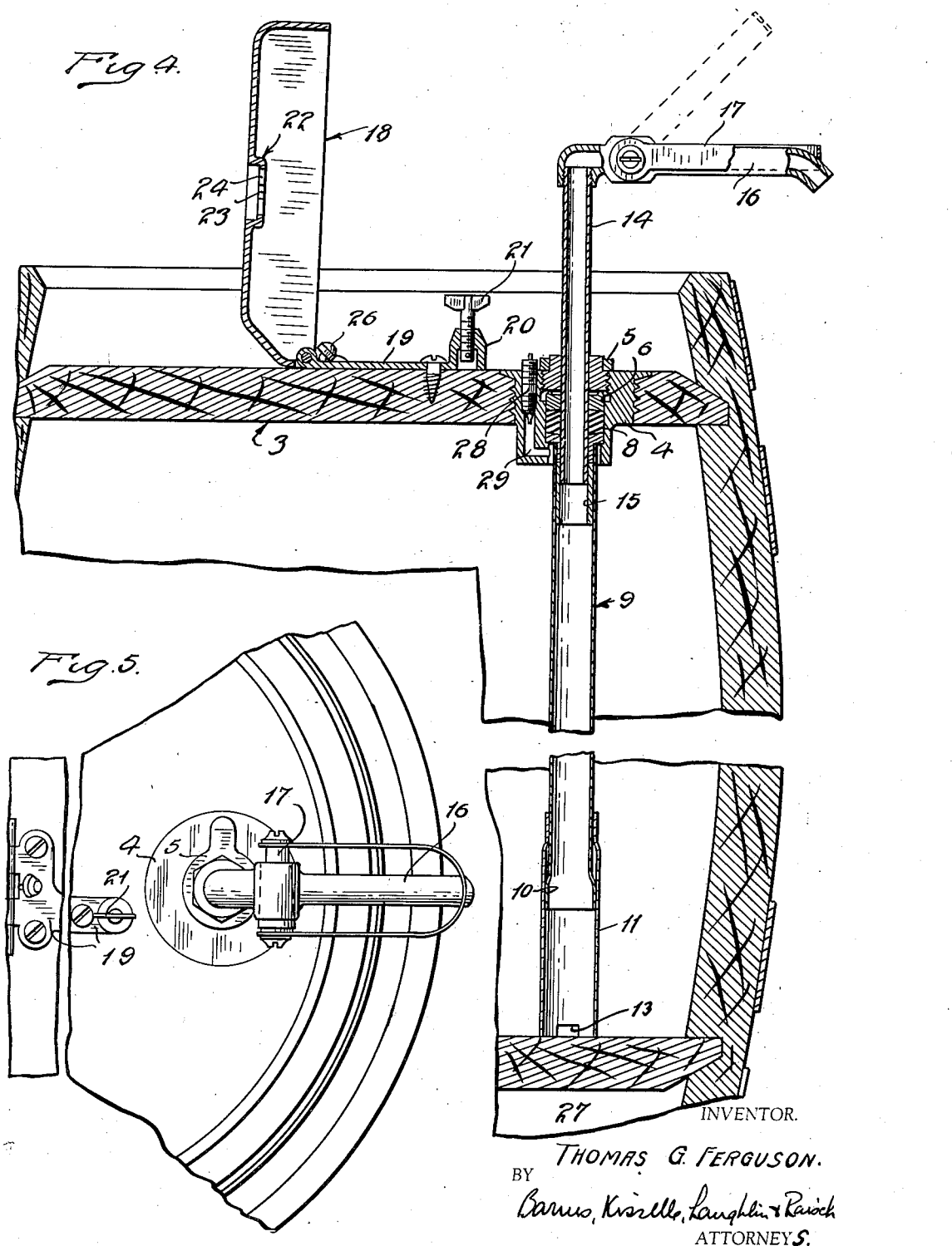

Patented June 15, 1937

2,083,776

UNITED STATES PATENT OFFICE 2,083,776

LIQUID DISPENSING APPARATUS

Thomas Graham Ferguson, Windsor, Ontario, Canada, assignor to Otis L. Smith, Thomas G. Ferguson and A. J. Stock, a limited partnership doing business as The Sani-Draft Pump Company, Detroit, Mich.

Application May 2, 1934, Serial No. 723,434

22 Claims. (Cl. 225—1)

This invention relates to liquid dispensing apparatus, and more particularly to apparatus for dispensing beer and similar liquids directly from the container.

Heretofore beer and similar substances have been dispensed from barrels by two different methods; the first and most common in practice being to tap the keg by forcing in the tap plug or cork, together with the Government seal, by means of a tap rod, and such tap rod usually included a housing or union having a conduit for connection to the $CO_2$ tank or other source of supply and another conduit for connection to the draft arm or faucet. The other method embodied dispensing directly from the barrel such as shown in Patent No. 798,942 to Baroch. In this type of dispensing apparatus apparently the dispensing unit itself formed a part of the barrel or other container during the filling operation.

The present invention contemplates the use of a dispensing device which forms part of the beer barrel or other container as it is delivered from the brewer to the retailer, said dispensing device being of such form that it may be securely locked and made fool proof in its shipment from the brewer to the retailer or dispenser. More specifically, the present invention embodies a tap rod insertable through a tap opening in much the usual manner but which, in addition, contemplates a vertically slidable and rotatable draft arm, such vertical slidability positioning the draft arm a fairly good height above the container to permit of easy quick dispensing and such vertical slidability, in combination with the rotation of the draft arm, making it possible to collapse the draft arm flatly against the top of the barrel. A suitable locking cover is adapted to completely enclose the collapsed draft arm and lock the same in position during shipment and storage.

Other features of the invention embody a draft rod adaptable to different heights of containers, novel means for introducing gas at the end of the barrel to provide pressure, and various details of construction as will be more clearly brought out in the specification and claims.

In the drawings:

Fig. 1 is a fragmentary vertical sectional view of one embodiment of my liquid dispensing device as applied in a lot form to a beer barrel.

Fig. 2 is a sectional plan view taken on line 2—2 of Fig. 1.

Fig. 3 is a sectional view taken on line 3—3 of Fig. 1 illustrating relative positions of the draft arm or faucet, housing and locking means.

Fig. 4 is a sectional view similar to Fig. 1 showing the locking cover in raised position and the draft arm in raised dispensing position.

Fig. 5 is a fragmentary plan view of the dispensing parts in their position shown in Fig. 4.

It will be understood that the dispensing apparatus forming the preferred embodiment of the present invention may be used with any type of container and preferably with wooden or metal beer barrels, a standard wooden barrel being shown in the drawings as at 2, the head portion being designated 3. Standard barrels are usually provided with a bung opening in the side through which the barrel is filled and a keg plug 4 through which the beverage is dispensed.

In place of the standard keg plug, I preferably use a plug 4, as best shown in Fig. 1, which may be screwed into the head 3 of the keg and which is threaded at the upper end to receive a packing nut 5. The portion of the plug beneath the packing nut 5 is apertured to receive packing glands 6 and 7, and a shoulder at the lower end of the plug 4 retains the lowermost packing gland 7 in position.

The lowermost opening 8 of the plug 4 is of such diameter as to permit lowering therethrough of a tap rod generally designated 9. This tap rod is preferably formed of a sheet metal tube, rigidly secured to the lowermost packing gland 7, and enlarged at its lower end as at 10. A telescoping extension 11 of the tap rod has an inwardly extending shoulder portion 12 which cooperates with the enlarged portion 10 and also assists in maintaining a substantial seal between the two telescoping parts. With this telescoping arrangement it will be obvious that the draft rod will accommodate itself to various depth barrels, this being particularly true of wooden barrels which vary in shape during continued use. An opening or openings 13 permit free flow of beer through the draft tube even though such tube contacts with the bottom of the barrel.

A dispensing tube 14 carrying a sliding tube stop 15 is vertically slidable through the packing glands 6 and 7 and the packing nut 5. In this connection it will be noted that the packing glands 6 and 7 have concave surfaces for cooperating with the packing whereby to give the packing an inwardly converging depressing action when moved relative to each other. Furthermore, the tube stop 15 also greatly assists in sealing the sliding tube 14 and the draft rod 9.

The upper end of the dispensing tube 14 terminates in a draft arm 16 provided with a standard type valve handle 17. It will thus be seen that the draft arm and dispensing tube may be rotated about the axis of the draft rod and lowered to the position shown in Fig. 1, or may be raised and rotated to the position shown in Fig. 4.

A tamper proof cover or housing 18 is pivotally mounted on and secured to the top of the barrel by means of a bracket member 19. This housing 18 is of such size as to completely cover the exposed portion of the dispensing apparatus when in the lowered position as shown in Figs. 1 and 2. The innermost end of the bracket 19 terminates in a locking fixture 20 which includes a key operated locking member 21. The locking member 21 is adapted to cooperate with a depressed portion 22 of the cover. This depressed portion is apertured as at 23 and slotted as at 24 so that with the locking member 21 in the position shown in Fig. 4, the cover 18 may be swung downwardly and the wings of the locking member 21 will pass through the slot 24. A suitable key or other means may then be used to turn the wings of the locking member to the right which will simultaneously lock and tighten the cover in position. After the beer has been injected into the keg through the bung hole in the side of the barrel in the standard manner, the casing may be locked in position as above described and a revenue stamp 25 pasted across the top of the casing 18 and over the depression 22.

To obtain beer from the barrel it is necessary to puncture the revenue stamp with a key or other means, rotate the locking member 21 so that the wings thereof cooperate with the slot and then raise the cover member 18. As previously explained, the draft arm 16 may then be moved vertically and swung around to dispensing position as shown in Fig. 4, dispensing, of course, being controlled by movement of the valve handle 17.

A stopper member 26 is adapted to cooperate with the end of the draft arm 16 so as to positively prevent any leakage while the dispensing apparatus is in closed locked position as shown in Fig. 1.

The contents of the container 2 may be cooled in various ways as well known to those skilled in the art. I preferably cool the container by providing a chamber 27 at the bottom of the barrel, which chamber may be filled with solid $CO_2$ or other cooling medium so that the beer is directly cooled at the point where it is forced up into the draft rod 9. A suitable valve 28 and passageway 29 permit the introduction into the barrel of air or gas so as to assist in the dispensing of the beer or other liquid from the barrel. By placing the air valve 28 and conduit 29 as a part of the keg plug, at will be seen that all parts may be removed at once and cleaned. The top 3 of the barrel is preferably positioned at such a distance from the rim that the top of the casing 18 will be below the rim of the barrel when in closed locked position.

What I claim is:

1. Liquid containing and dispensing apparatus comprising draft means insertable through the top of the container, a draft arm and dispensing tube vertically slidable and rotatable relative to said draft means, a casing adapted to be lowered and locked in position over the draft arm when said draft arm is lowered adjacent the top of the container, and locking means cooperating with said casing and movable to lock said casing in position, said casing including a surface for receiving a revenue stamp, said surface being positioned above said locking means whereby said stamp must be punctured before the locking means is actuated to release the casing.

2. Liquid containing and dispensing apparatus comprising in combination a container, one wall of the container having an opening, draft apparatus insertable through and secured in said opening, said draft apparatus being removable but normally being a fixed part of the container whereby the container may be filled, shipped, and the liquid dispensed while the draft apparatus is a part thereof, a draft arm and dispensing tube forming a part of but vertically and rotatably slidable relative to the rest of the draft apparatus and to a dispensing position, means for locking said draft arm in its innermost position against said wall of the container, said means including a surface for the reception of a revenue stamp, and locking means positioned beneath said stamp whereby said stamp must be punctured before said locking means can be actuated and the draft arm moved, said locking means being such as to prevent dispensing of beer through the draft arm while in locked position.

3. Liquid containing and dispensing apparatus comprising draft means insertable through the top of the container, a draft arm and dispensing tube vertically slidable and rotatable relative to said draft means, and a casing adapted to be lowered and locked in position over the draft arm when said draft arm is lowered adjacent the top of the container, said draft means including a telescoping extension whereby said draft means is adjustable to different heights of containers.

4. Liquid containing and dispensing apparatus comprising draft means insertable through the top of the container, a draft arm and dispensing tube vertically slidable and rotatable relative to said draft means, a casing adapted to be lowered and locked in position over the draft arm when said draft arm is lowered adjacent the top of the container, and locking means cooperating with said casing and movable to lock said casing in position, said casing including a surface for receiving a revenue stamp, said surface being positioned above said locking means whereby said stamp must be punctured before the locking means is actuated to release the casing, said draft means including a telescoping extension whereby said draft arm is adjustable to different heights of containers.

5. Liquid containing and dispensing apparatus comprising in combination a container, one wall of the container having an opening, draft apparatus insertable through and secured in said opening, said draft apparatus being removable but normally being a fixed part of the container whereby the container may be filled, shipped, and the liquid dispensed while the draft apparatus is a part thereof, a draft arm and dispensing tube forming a part of but vertically and rotatably slidable relative to the rest of the draft apparatus and to a dispensing position, means for locking said draft arm in its innermost position against said wall of the container, said means including a surface for the reception of a revenue stamp, and locking means positioned beneath said stamp whereby said stamp must be punctured before said locking means can be actuated and the draft arm moved, said locking means being such as to prevent dispensing of beer through the draft arm while in locked position, said draft means including a telescoping extension whereby said draft means is adjustable to different heights of containers.

6. Liquid containing and dispensing apparatus comprising in combination a container, one wall of the container having an opening, draft apparatus insertable through and secured in said opening, said draft apparatus being removable but normally being a fixed part of the container whereby the container may be filled, shipped, and the liquid dispensed while the draft apparatus is a part thereof, a draft arm and dispensing tube forming a part of but vertically and rotatably slidable relative to the rest of the draft apparatus and to a dispensing position, means for locking said draft arm in its innermost position against said wall of the container, said means including a surface for the reception of a revenue stamp, locking means positioned beneath said stamp whereby said stamp must be punctured before said locking means can be actuated and the draft arm moved, said locking means being such as to prevent dispensing of beer through the draft arm while in locked position, and a stop secured to the end of said dispensing tube for limiting the upward position thereof.

7. Liquid containing and dispensing apparatus comprising draft means insertable through the top of the container, a draft arm and dispensing tube vertically slidable and rotatable relative to said draft means, a casing adapted to be lowered and locked in position over the draft arm when said draft arm is lowered adjacent the top of the container, said draft means including a main draft tube extending to a point adjacent the bottom of the container, and means secured to the lower end of said dispensing tube and substantially filling and sealing the space between and limiting the relative movement of said dispensing tube and main draft tube.

8. Liquid containing and dispensing apparatus comprising in combination a container, one wall of the container having an opening, draft apparatus insertable through and secured in said opening, said draft apparatus being removable but normally being a fixed part of the container whereby the container may be filled, shipped, and the liquid dispensed while the draft apparatus is a part thereof, a draft arm and dispensing tube forming a part of but vertically and rotatably slidable relative to the rest of the draft apparatus and to a dispensing position, means for locking said draft arm in its innermost position against said wall of the container, and means including a surface for the reception of a revenue stamp, locking means positioned beneath said stamp whereby said stamp must be punctured before said locking means can be actuated and the draft arm moved, said locking means being such as to prevent dispensing of beer through the draft arm while in locked position, said draft apparatus including a main draft tube extending to a point adjacent the bottom of the container, and means secured to the lower end of said dispensing tube and substantially filling and sealing the space between said dispensing tube and main draft tube and limiting the outward movement of said dispensing tube.

9. Liquid containing and dispensing apparatus comprising in combination a container, one wall of the container having an opening, draft apparatus insertable through and secured in said opening, said draft apparatus being removable but normally being a fixed part of the container whereby the container may be filled, shipped, and the liquid dispensed while the draft apparatus is a part thereof, a draft arm and dispensing tube forming a part of but vertically and rotatably slidable relative to the rest of the draft apparatus and to a dispensing position, means for locking said draft arm in its innermost position against said wall of the container, said means including a surface for the reception of a revenue stamp, locking means positioned beneath said stamp whereby said stamp must be punctured before said locking means can be actuated and the draft arm moved, said locking means being such as to prevent dispensing of beer through the draft arm while in locked position, and means forming a part of said insertable draft apparatus for admitting gas to said container to assist in dispensing the contents thereof.

10. Liquid containing and dispensing apparatus comprising draft means insertable through the top of the container, a draft arm and dispensing tube vertically slidable and rotatable relative to said draft means, and a casing adapted to be lowered and locked in position over the draft arm when said draft arm is lowered adjacent the top of the container, said draft means including a main draft tube and a telescoping extension whereby said draft tube is adjustable to a position adjacent the bottoms of different height containers, and a cooling chamber at the bottom of said container adapted to receive cooling means for cooling the liquid at the point of entrance into said draft tube.

11. Liquid containing and dispensing apparatus comprising draft means insertable through the top of the container, a draft arm and dispensing tube vertically slidable and rotatable relative to said draft means, said draft means including a telescoping extension whereby said draft means is adjustable to a position adjacent the bottoms of different height containers, and a cooling chamber at the bottom of said container adapted to receive cooling means for cooling the liquid at the point of entrance into said draft means.

12. Liquid containing and dispensing apparatus comprising draft means insertable through the top of the container, a draft arm and dispensing tube vertically slidable relative to said draft means, and a casing adapted to be lowered and locked in position over the draft arm when said draft arm is lowered adjacent the top of the container, said draft means including a telescoping extension whereby said draft means is adjustable to a position adjacent the bottoms of different height containers, and a cooling chamber at the bottom of said container adapted to receive cooling means for cooling the liquid at the point of entrance into said draft means.

13. Liquid containing and dispensing apparatus comprising draft means insertable through the top of the container, a draft arm and dispensing tube vertically slidable relative to said draft means, said draft means including a main draft tube and a telescoping extension whereby said draft means is adjustable to a position adjacent the bottoms of different height containers, and a cooling chamber at the bottom of said container adapted to receive cooling means for cooling the liquid at the point of entrance into said draft tube.

14. Liquid containing and dispensing apparatus comprising in combination a container, one wall of the container having an opening, draft apparatus insertable through and secured in said opening, said draft apparatus being removable but normally being a fixed part of the container whereby the container may be filled, shipped, and the liquid dispensed while the draft apparatus is a part thereof, and a draft arm and dispensing tube forming a part of but vertically slidable relative to the rest of the draft apparatus, said draft apparatus including a telescoping extension at the innermost end thereof whereby said draft apparatus is adjustable to different depths of container.

15. Liquid containing and dispensing apparatus comprising draft means removably insertable through the top of the container, a dispensing tube vertically slidable within said draft means, a draft arm connected to said dispensing tube and vertically slidable and rotatable relative to said draft means, means for locking said draft arm in non-dispensing position, sealing means for preventing dispensing of beer through the draft arm while in this position, said locking means including a surface for a revenue stamp and so positioned relative to said sealing means as to require puncturing of said stamp before release of said sealing means.

16. Liquid containing and dispensing apparatus comprising draft means removably insertable through the top of the container, a dispensing tube vertically slidable within said draft means, a draft arm connected to said dispensing tube and vertically slidable and rotatable relative to said draft means, means for locking said draft arm in non-dispensing position, sealing means for preventing dispensing of beer through the draft arm while in this position, said locking means including a surface for a revenue stamp and so positioned relative to said sealing means as to require puncturing of said stamp before said sealing means can be released and before said draft arm can be moved to dispensing position.

17. Liquid containing and dispensing apparatus comprising draft means insertable through the top of the container, a dispensing tube, a draft arm mounted on said tube and vertically slidable and rotatable relative to said draft means, a casing adapted to be lowered and locked in position over the draft arm when said draft arm is lowered adjacent the top of the container, and locking means cooperating with said casing and movable to lock said casing in position, said casing including a surface for receiving a revenue stamp, said surface being positioned above said locking means whereby said stamp must be punctured before the locking means is actuated to release the casing.

18. Liquid containing and dispensing apparatus comprising draft means insertable through the top of the container, a vertically slidable dispensing tube, a draft arm secured to and movable with the tube into lowered position adjacent the top of the container, and a casing adapted to be lowered and locked in position over the draft arm when said draft arm is lowered adjacent the top of the container, said draft means including a telescoping extension whereby said draft means is adjustable to different heights of containers.

19. Liquid containing and dispensing apparatus comprising draft means insertable through the top of the container, a vertically slidable dispensing tube, a draft arm secured to and movable with the tube into lowered position adjacent the top of the container, a casing adapted to be lowered and locked in position over the draft arm when said draft arm is lowered adjacent the top of the container, said draft means including a main draft tube extending to a point adjacent the bottom of the container, and means secured to and movable with the lower end of said dispensing tube and substantially filling and sealing the space between said dispensing tube and main draft tube irrespective of any position of the dispensing tube within the draft tube.

20. Liquid containing and dispensing apparatus comprising in combination a container, one wall of the container having an opening, draft apparatus insertable through and secured in said opening, said draft apparatus being removable but normally being a fixed part of the container whereby the container may be filled, shipped, and the liquid dispensed while the draft apparatus is a part thereof, and a draft arm and dispensing tube forming a part of but vertically slidable relative to the rest of the draft apparatus, said draft apparatus including a telescoping extension at the innermost end thereof whereby said draft apparatus is adjustable to different depths of container, and a cooling chamber at the bottom of said container adapted to receive cooling means for cooling the liquid at the point of entrance into said draft apparatus.

21. Liquid containing and dispensing apparatus comprising draft means insertable through the top of the container, a vertically slidable dispensing tube, a draft arm secured to and movable with the tube into lowered position adjacent the top of the container, means adapted to be lowered and locked in position over the draft arm when said draft arm is lowered adjacent the top of the container, said draft means including a telescoping extension whereby said draft means is adjustable to different heights of containers, and a cooling chamber at the bottom of said container adapted to receive cooling means for cooling the liquid at the point of entrance into said draft means.

22. Liquid containing and dispensing apparatus comprising draft means insertable through the top of the container, a vertically slidable dispensing tube, a draft arm secured to and movable with the tube into lowered position adjacent the top of the container, a casing adapted to be lowered and locked in position over the draft arm when said draft arm is lowered adjacent the top of the container, said draft means including a main draft tube extending to a point adjacent the bottom of the container, means substantially filling and sealing the space between said dispensing tube and main draft tube irrespective of any position of the dispensing tube within the draft tube, and a cooling chamber at the bottom of said container adapted to receive cooling means for cooling the liquid at the point of entrance into said draft tube.

THOMAS GRAHAM FERGUSON.